(12) United States Patent
Peinemann et al.

(10) Patent No.: US 10,450,632 B2
(45) Date of Patent: Oct. 22, 2019

(54) CHELATING POLYMERIC MEMBRANES

(71) Applicant: King Abdullah University of Science and Technology, Thuwal (SA)

(72) Inventors: Klaus-Viktor Peinemann, Thuwal (SA); Luis Francisco Villalobos Vazquez De La Parra, Thuwal (SA); Roland Hilke, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 732 days.

(21) Appl. No.: 14/902,956

(22) PCT Filed: Jul. 3, 2014

(86) PCT No.: PCT/IB2014/002354
§ 371 (c)(1),
(2) Date: Jan. 5, 2016

(87) PCT Pub. No.: WO2015/008168
PCT Pub. Date: Jan. 22, 2015

(65) Prior Publication Data
US 2016/0138129 A1    May 19, 2016

Related U.S. Application Data

(60) Provisional application No. 61/843,091, filed on Jul. 5, 2013.

(51) Int. Cl.
*B01D 15/00* (2006.01)
*C22B 9/02* (2006.01)
(Continued)

(52) U.S. Cl.
CPC .............. *C22B 9/023* (2013.01); *B01D 63/00* (2013.01); *B01D 67/0016* (2013.01);
(Continued)

(58) Field of Classification Search
USPC ........ 210/500.1, 500.21, 500.27, 502.1, 503, 210/505, 506, 507
See application file for complete search history.

(56) References Cited

U.S. PATENT DOCUMENTS 3,240,764 A    3/1966  Beaman et al. ................. 528/68
5,028,260 A    7/1991  Harris et al. .................... 75/736
(Continued)

OTHER PUBLICATIONS

Lata et al., Int. J. Environ. Sci. Technol. (2015) 12:1461-1478 (Year: 2015).*
(Continued)

*Primary Examiner* — Allison G Fitzsimmons
(74) *Attorney, Agent, or Firm* — Billion & Armitage; Lisbeth C. Robinson

(57) ABSTRACT

The present application offers a solution to the current problems associated with recovery and recycling of precious metals from scrap material, discard articles, and other items comprising one or more precious metals. The solution is premised on a microporous chelating polymeric membrane. Embodiments include, but are not limited to, microporous chelating polymeric membranes, device comprising the membranes, and methods of using and making the same.

13 Claims, 3 Drawing Sheets

| Initial Au (ppm) | Initial Cu (ppm) | Final Au (ppm) | Final Cu (ppm) | Au recovered (%) | Cu recovered (%) |
|---|---|---|---|---|---|
| 100 | 100 | 1.20 | 85.23 | 99 | 15 |
| 100 | 500 | 9.47 | 444.26 | 91 | 11 |
| 500 | 500 | 270.14 | 484.27 | 46 | 3 |
| 100 | 900 | 3.10 | 760.41 | 97 | 16 |

(51) Int. Cl.
| | |
|---|---|
| *B01D 67/00* | (2006.01) |
| *B01D 71/62* | (2006.01) |
| *B01D 71/66* | (2006.01) |
| *B01D 63/00* | (2006.01) |
| *B01D 69/02* | (2006.01) |
| *C08J 9/26* | (2006.01) |
| *C22B 3/00* | (2006.01) |
| *C22B 15/00* | (2006.01) |
| *B01D 63/08* | (2006.01) |
| *B01D 61/14* | (2006.01) |

(52) U.S. Cl.
CPC ......... *B01D 67/0023* (2013.01); *B01D 69/02* (2013.01); *B01D 71/62* (2013.01); *B01D 71/66* (2013.01); *C08J 9/26* (2013.01); *C22B 11/04* (2013.01); *C22B 15/0063* (2013.01); *B01D 61/145* (2013.01); *B01D 2325/022* (2013.01); *B01D 2325/12* (2013.01); *C08J 2381/00* (2013.01)

(56) References Cited

U.S. PATENT DOCUMENTS

2008/0241503 A1   10/2008   Romdhane et al. ....... 428/315.9
2012/0228151 A1   9/2012    Moradi et al. ................ 205/571
2012/0234138 A1   9/2012    Hatano et al. .................. 75/744

OTHER PUBLICATIONS

Mayer et al., Journal of Membrane Science 277 (2006) 258-269 (Year: 2006).*
Drioli et al., Springer-Verlag Berlin Heidelberg 2015 E. Drioli, L. Giorno (eds.), Encyclopedia of Membranes, DOI 10.1007/978-3-642-40872-4_2244-1 (Year: 2015).*
Strathmann, Wiley-VCH Verlag GmbH & Co. KGaA, Weinheim (Year: 2012).*
International Search Report and Written Opinion issued in PCT/IB2014/002354, dated Apr. 29, 2015.
Chen et al., "Preparation and performance of cellulose acetate/polyethyleneimine blend microfiltration membranes and their applications", *Journal of Membrane Science*, 235: 73-86, 2004.

* cited by examiner

| Initial Au (ppm) | Initial Cu (ppm) | Final Au (ppm) | Final Cu (ppm) | Au recovered (%) | Cu recovered (%) |
|---|---|---|---|---|---|
| 100 | 100 | 1.20 | 85.23 | 99 | 15 |
| 100 | 500 | 9.47 | 444.26 | 91 | 11 |
| 500 | 500 | 270.14 | 484.27 | 46 | 3 |
| 100 | 900 | 3.10 | 760.41 | 97 | 16 |

CHELATING POLYMERIC MEMBRANES

CROSS-REFERENCE TO RELATED APPLICATION

This application is a national phase application under 35 U.S.C. § 371 of International Application No. PCT/IB2014/002354 filed Jul. 3, 2014, which claims the benefit of priority of U.S. Provisional Patent Application No. 61/843,091, filed on Jul. 5, 2013. The entire contents of each of the above-referenced disclosures are specifically incorporated herein by reference without disclaimer.

BACKGROUND OF THE INVENTION

A. Field of the Invention

The invention generally concerns microporous polymeric membranes for selective recovery of desired metals and methods of making and using the same.

B. Description of Related Art

The demand for precious metals, such as gold, is high and continues to grow. Gold and other precious metals are widely used in electronics, jewelry, catalysts and medical applications. In addition, emerging technologies, such as nanoelectronics and microelectromechanical systems (MEMS), generate more pressure on the already high demand.

Given the number and variety of articles that contain precious metals, these discarded articles can be a viable source of precious metals. For example, cellular phone scrap contains around 200 g of gold per ton of scrap, while the gold present in the gold ores used in mining contains between 5 and 30 g of gold per ton of ore. Ogata, T. and Y. Nakano, "*Mechanisms of gold recovery from aqueous solutions using a novel tannin gel adsorbent synthesized from natural condensed tannin,*" Water Research, 39(18): 4281-4286 (2005).

To recover the gold present in electronic scrap, for example, the scrap is dissolved in an acidic solution. The gold is then recovered from the acidic solution. The current techniques used to recover the gold include precipitation, ion exchange, solvent extraction or adsorption into a solid adsorbent. These current recovery and recycling technologies present various disadvantages such as slow kinetics, low selectivity, the requirement of large amounts of organic solvents, and/or irreversible adsorption of metal.

For example, the main disadvantages of solvent extraction methods include the large amounts of organic solvents required, the loss of residual organic solvent to the aqueous phase, and the difficulty of implementing into a continuous process. Some commercial examples of solvent extraction include using Dibutylcarbitol (DBC) and methyl isobutyl ketone (MIBK) as extractants for Au(III) in HCl solutions. However, these extractants exhibit relatively low selectivity, and the subsequent recovery is usually done by reduction of the organic to form metallic gold. US Patent Publication No. 2012/0234138 presents a method to use DBC for very diluted gold solutions (10 ppm or less). Another solvent extraction method is presented in US Patent Publication No. 2012/0228151, describing a process to efficiently recover gold and palladium from acidic solutions using dithiobiuret derivatives.

With regard to ion-exchange resins to recover the gold from acidic solutions, in most cases, the resin needs to be destroyed to recover the gold, as it is either irreversibly adsorbed or in-situ reduction takes place. U.S. Pat. No. 5,028,260 describes a process in which the acidic gold-containing solution is oxidized with hydrogen peroxide to guaranty that all the gold ions are in the +3 oxidation state and finally contact the solution with a polymeric acrylic ester ion-exchange resin to selectively adsorb gold. Other drawbacks of ion-exchange resins include the necessity to oxidize the solution before contacting it with the resin, the low capacities of the resins, and the need to operate at slow fluxes to achieve good adsorption.

Solid adsorbents are a good option for gold recovery because they are easy to handle and tend to produce less amount of waste compared to solvent extraction. However, known solid adsorbents for gold recovery present either slow kinetics of adsorption, low capacity, or difficult elution of the gold. The most common solid adsorbent for this application is activated carbon. The disadvantage of using activated carbon as the adsorbent is the complexity and cost of the regeneration process. During the recovery cycle, some carbonates will precipitate plugging the pores of the carbon, and if there are traces of organic materials, they can deactivate the gold adsorption properties. For this reason carbon is treated with a mineral acid solution and roasted. During this process, a significant amount of carbon can be lost. Several gold adsorbents can be found in the literature with high maximum uptakes but slow kinetics, as most of them take several hours to reach equilibrium. Some examples of these adsorbents are cross-linked paper gel with a maximum uptake of 5.05 mmol/g and a time to reach equilibrium of 32 hours, tannin gel with a maximum uptake of 40.62 mmol/g and more than 300 hours to reach equilibrium, and dimethylamine-persimmon waste with a maximum uptake of 5.63 mmol/g and 5 hours to reach equilibrium.

In order to supply the ever increasing demand, new metal recovery and recycling technologies need to be developed.

SUMMARY OF THE INVENTION

The present application offers a solution to the current problems associated with recovery and recycling of precious metals from scrap material, discard articles, and other items comprising one or more precious metals. The solution is premised on a microporous chelating polymeric membrane.

In one instance, there is disclosed a polymeric membrane comprising, in the polymeric backbone, a thiosemicarbazide group. In another instance, there is disclosed a polymeric membrane prepared with a polymer formed by polymerizing N,N'-diaminopiperazine and a difunctional co-reactant capable of forming with N,N'diaminopiperazine a polymer comprising the resulting thiosemicarbazide:

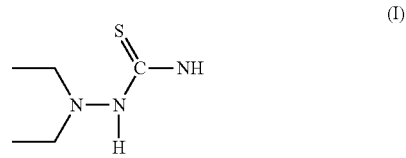

As disclosed herein, the difunctional co-reactant can include various diisothiocyanates such as methylene-bis (4-phenylisothiocyanate) and m-phenylene diisothiocyanate.

In another instance, there is disclosed a microporous membrane comprising a polymer having the recurring unit:

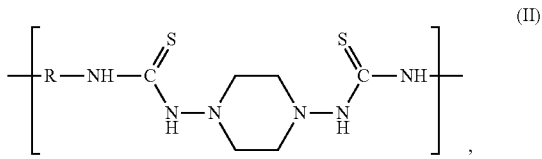

(II)

where R is a bivalent hydrocarbon radical and wherein the microporous membrane is a sheet, a hollow fiber, a fiber, or a particle. In various embodiments, R comprises an alkanediyl, oxy-alkanediyl, methylene diphenylene, or phenylene. In certain instances, the polymer comprises the following recurring unit.

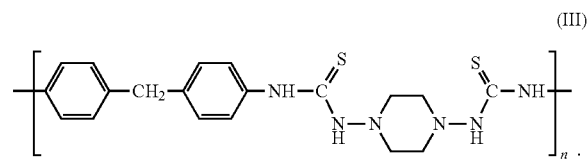

(III)

In another instance, there is disclosed a method of making a microporous polymeric membrane by causing a polymer solution comprising a polymer and a solvent system to form a polymeric body, wherein the polymer comprises the recurring unit of Formula II and R is a bivalent hydrocarbon radical. Next, at least a portion of the polymeric body is exposed to a non-solvent system thereby causing the portion of the polymeric body to become microporous. In some instances, the solvent and the non-solvent are miscible. In various embodiments, the solvent system comprises dimethyl sulfoxide, and can further comprise 1,4-dioxane. In some instances, the non-solvent system comprises water. In various embodiments, the non-solvent system comprises non-solvent and a solvent, e.g., dimethylsulfoxide. In various embodiments, the microporous polymeric body is a sheet, a hollow fiber, a fiber, a bead, or a particle. In order to vary the surface area (or porosity), the method can further comprise evaporating at least a portion of the solvent system from the polymeric body prior to exposing the polymeric body to the non-solvent system. As stated above, in various embodiments, R can comprise an alkanediyl, oxy-alkanediyl, methylene diphenylene, or phenylene. In certain instances, the polymer comprises the recurring unit of Formula III.

In other instances, there is disclosed a membrane module for selective recovery of a metal ion comprising a casing having flanges which support and sealingly close ends of the casing; an inlet opening configured to couple with an inlet conduit for introducing a feed into the casing; an outlet opening configured to couple with an outlet conduit for removing a filtrate from the casing; and a membrane cell comprising a microporous polymeric body, wherein the polymer has the recurring unit of Formula II, wherein R is a bivalent hydrocarbon radical. In various embodiments, R can comprise an alkanediyl, oxy-alkanediyl, methylene diphenylene, or phenylene. In certain instances, the polymer comprises the recurring unit of Formula III. In various embodiments, the membrane module further comprises an evacuation opening configured to couple with an evacuation conduit for the egress of the filtrate from the casing, such that the portion of filtrate passing through the evacuation opening has passed through the microporous polymeric body from a first surface of the microporous polymeric body to a second surface of the microporous polymeric body. In some instances, the microporous body comprises a plurality of fibers, particles, beads, or hollow fibers or a spirally-wound sheet. In certain instances, the microporous polymeric body comprises a plurality of hollow fibers bundled longitudinally.

In another instance, there is disclosed a method of separating metal ions from a solution that comprises contacting a metal ion-containing solution with a microporous polymeric body wherein the polymer comprises recurring units of Formula II, whereby a fraction of metal ions binds to the microporous polymeric body and wherein R is a bivalent hydrocarbon radical. The method can further comprise contacting a recovery solution with the microporous polymeric body to strip the metal ions from the microporous polymeric body. In some instances, the recovery solution comprises thiourea and sulfuric acid. In various embodiments, the microporous polymeric body is contacted with the metal ion-containing solution after contact with the recovery solution. In various embodiments, the metal-ion containing solution comprises a first metal ion, e.g., gold, and a second metal ion, e.g., copper, and wherein the microporous polymeric body selectively absorbs the first metal ion. In various embodiments, the flux of the microporous polymeric body is at least 1 L/hm2, at least 1500 L/hm2, or at least 1750 L/hm2. In various embodiments, the loadings of gold is at least 0.1 mmol/g, at least 2 mmol/g, or at least 3 mmol/g. In various embodiments, the microporous polymeric body is a sheet, a fiber, a hollow fiber, a bead, or a particle. In various embodiments, R comprises an alkanediyl, oxy-alkanediyl, methylene diphenylene, or phenylene. In various embodiments, the polymer comprises the recurring unit of Formula III.

The term "coupled" is defined as connected, although not necessarily directly, and not necessarily mechanically.

The terms "a" and "an" are defined as one or more unless this disclosure explicitly requires otherwise.

The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, the methods and systems of the present invention that "comprises," "has," "includes" or "contains" one or more elements possesses those one or more elements, but is not limited to possessing only those one or more elements. Likewise, an element of a method or system of the present invention that "comprises," "has," "includes" or "contains" one or more features possesses those one or more features, but is not limited to possessing only those one or more features.

Furthermore, a structure that is capable performing a function or that is configured in a certain way is capable or configured in at least that way, but may also be capable or configured in ways that are not listed. Metric units may be derived from the English units provided by applying a conversion and rounding to the nearest millimeter.

The feature or features of one embodiment may be applied to other embodiments, even though not described or illustrated, unless expressly prohibited by this disclosure or the nature of the embodiments.

Any method or system of the present invention can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF THE INVENTION

Figures 1A, 1B, 1C, 1D:
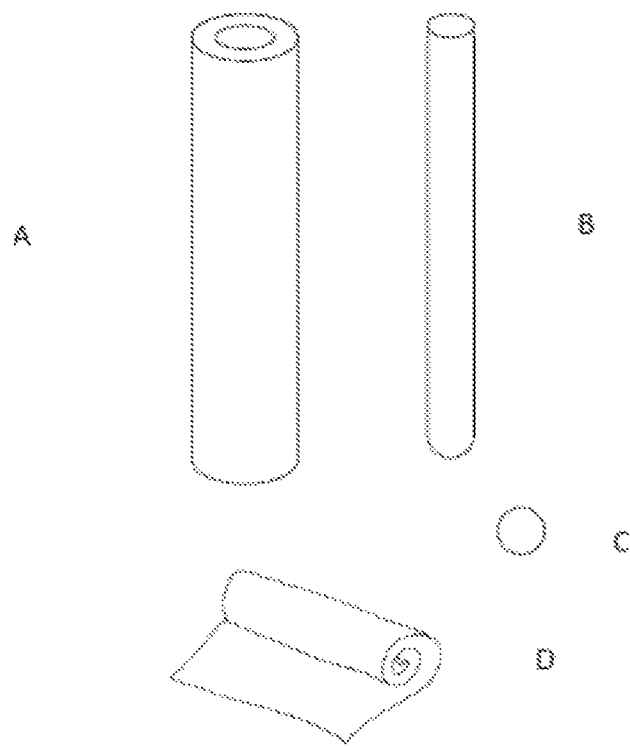
FIGS. 1A-1D illustrate various polymeric body shapes.

Various features and advantageous details are explained more fully with reference to the non-limiting embodiments that are illustrated in the accompanying drawings and detailed in the following description. It should be understood, however, that the detailed description and the specific examples, while indicating embodiments of the invention, are given by way of illustration only, and not by way of limitation. Various substitutions, modifications, additions, and/or rearrangements will become apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Disclosed herein is a microporous polymeric chelating membrane for the selective recovery of one or more metal ions from a solution and methods of using and making the same. The microporous polymeric membrane comprises, in the polymeric backbone, thiosemicarbazide groups. In various embodiments, the mole fraction of the thiosemicarbazide in the polymer is at least 0.05, 0.08, 0.1, 0.2, or 0.3.

In various embodiments, the microporous membrane comprises a polymer having the following recurring structural unit:

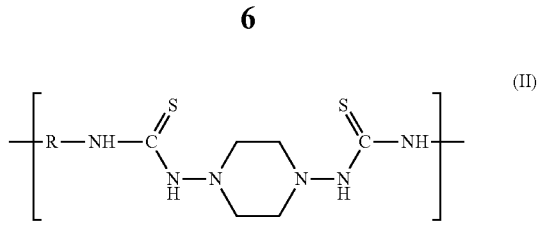

wherein R is a bivalent hydrocarbon radical. In various embodiments, R can comprise an alkanediyl, oxy-alkanediyl, methylene diphenylene, phenylene, and/or diphenylene ether. The weight average molecular weight can be in the range of about 10000 to 500000. For a fiber forming polymer, the molecular weight values can range from 20000 to 500000 for weight average MW.

In a preferred embodiment, the polymer comprises the following recurring structural unit:

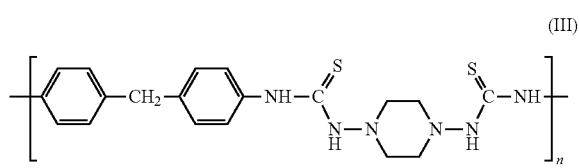

The weight average molecular weight can be in the range of about 10000 to 100000. For a fiber forming polymer, the molecular weight values can range from 20000 to 100000 for weight average MW.

In general, the polymeric chelating membrane is prepared by polymerizing N,N'-diaminopiperazine and a difunctional co-reactant capable of forming with N,N'diaminopiperazine the following:

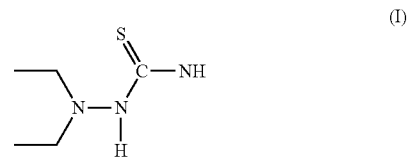

In some embodiments, the difunctional co-reactant includes various diisothiocyanates such as methylene-bis (4-phenylisothiocyanate), m-phenylene diisothiocyanate, xylene diisocyanate, cyclohexane diisocynate, and/or diphenylether diisocyanate. The preferred co-reactant is methylene-bis (4-phenylisothiocyanate). The prepared polythiosemicarbazide, dissolved in a solvent system, is then cast into a desired form (i.e., a polymeric body) and simultaneously or subsequently exposed to a non-solvent system, thereby inducing a phase separation. In some embodiments, the phase separation can be induced by immersion of a polymer solution into a vessel of non-solvent or by contacting the cast polymer solution with a vapor of non-solvent. In various embodiments, the polythiosemicarbazide solution can be cast into a sheet, a hollow fiber, a fiber, or a symmetrical or asymmetrical particle. Illustrated embodiments of the various shapes is provided in FIGS. 1A to 1D.

The above-mentioned solvent system comprises one or more solvents within which the described polythiosemicarbazide is soluble. In various embodiments, the solvent system comprises, consists of, or consists essentially of dimethyl sulfoxide (DMSO). The solvent system can further comprise, consist of, or consist essentially of 1,4-dioxane. For example, polymeric solution can have a weight percentage of DMSO between about 50 wt % to 100 wt % and a weight percentage of 1,4-dioxane between about 1 wt % to 50 wt %, preferably between 3 wt % and 20 wt %; 1,4-dioxane is used as an additive to decrease the formation of macrovoids in the membrane. Other solvents with low affinities for water that are miscible with DMSO and that, in low concentrations, do not promote the precipitation of the polymer in the polymeric solution could be used as well. Other suitable solvents include, but are not limited to tetrahydrofuran and/or cyclohexanone.

In contrast, the non-solvent system comprises one or more solvents within which the described polythiosemicarbazide is not soluble or has sufficiently limited solubility to induce a phase separation of the prepared polymer. In various embodiments, the non-solvent system comprises, consists essentially of, or consists of water. Other suitable non-solvents include, but are not limited to methanol, ethanol, and/or isopropanol. In a preferred embodiment, the solvent system and the non-solvent system are miscible.

In various embodiments, the polymeric body is exposed to the non-solvent system for a time of at least 0.1, 0.3, 0.5, 0.7, 0.8, 0.9, 1, 2, 3, 4, 5, 6, 7, 8, 9, 10, 11, 12, 13, 14, 15, 16, 17, 18 hours, or more. The time can be adjusted to account for the thickness or diameter of the polymeric body. Before immersion in the non-solvent, the polymeric body can be exposed to air for a time between 1 s and 30 min. During this time, part of the solvent evaporates leading to smaller pores in the membrane surface after precipitation.

Additives can be included in the solvent system or the non-solvent system to affect the membrane properties. For example, DMSO can be added to the non-solvent system to cause larger pores and higher porosity.

The described membranes can be in any suitable shape. For example, as previously mentioned, the described membranes can include a film, a fiber, a hollow fiber, or a particle. In various embodiments, the thickness of the described membrane, such as a film membrane, can range between 20 to 1000 μm. Similarly, the diameter of membrane particles can range between 50 to 1000 μm.

Figure 2:
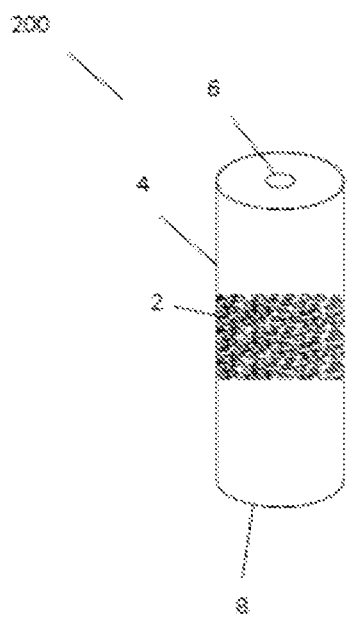
FIG. 2 illustrates an embodiment of a membrane filtration module in accordance with the present disclosure.

In various embodiments, with reference to FIG. 2, the microporous chelating polymeric membrane 2 can be incorporated into a membrane module 200 for selective recovery of one or more metal ions. Membrane module 200 can comprise a casing 4 defining a membrane cell. In various embodiments, casing 4 is a pressure vessel. Casing 4 can be a tubular conduit with ends that sealingly close to prevent or minimize leaking of the feed during operation. Casing 4 can comprise an inlet opening 6 configured to couple with an inlet conduit for introducing a feed into casing 4 and an outlet opening 8 configured to couple with an outlet conduit for removing a filtrate from casing 4. Casing 4 can define a membrane cell within which the described microporous polymeric body 2 can be located.

In further embodiments, the membrane module 200 can further comprise an evacuation opening (not shown) configured to couple with an evacuation conduit for the egress of the filtrate from casing 4, wherein the portion of filtrate passing through the evacuation opening has passed through microporous polymeric body 2 from a first surface of microporous polymeric body 2 to a second surface of microporous polymeric body 2. For example, the feed can pass into the lumen of a hollow fiber and through the membrane to the outer surface of the hollow fiber.

The casing can house any desired shape of a polymeric body, such as a plurality of particles or beads, a plurality of fibers or hollow fibers, or a sheet. The fibers or hollow fibers can be bundled longitudinally and arranged to extend along the direction of flow. The sheet can be spirally rolled, with the ends of the spiral facing the inlet and outlet openings of the membrane module.

Also disclosed is a method of using the described chelating polymeric membranes. In various embodiments, a method of separating metal ions from a solution can comprise contacting a metal ion-containing solution (e.g., a feed) with a described microporous polymeric body, whereby a fraction of the metal ions are absorbed by the microporous polymeric body.

The described chelating polythiosemicarbazide membrane can be used to selectively recover a metal ion from a solution containing at least two metal ions. For example, the metal ion-containing solution can comprise a first metal ion and a second metal ion, and upon contact with the microporous polymeric body, the first metal ion will be selectively absorbed but the second metal ion will not be absorbed or will be absorbed to a lesser degree. In various embodiments, the selectively absorbed metal(s), e.g., the first metal ion) is gold, palladium, and/or mercury. In addition, non-absorbing or lower-absorbing metals, e.g., the second metal ion, can include copper, nickel, cobalt, iron, and/or zinc.

In various embodiments, the described polythiosemicarbazide membrane can selectively absorb gold from a solution containing both gold and copper. For example, as shown in Example 5, less than 20% of the copper in a solution was absorbed by the prepared membrane. In all solutions tested in Example 5, the percentage of gold absorbed by the membrane was at least 6 times greater than that of copper.

In various embodiments, the membrane can be regenerated and reused. For example, the method of using the membrane to recover a metal can further comprise stripping at least a portion of the absorbed metal ions from the polythiosemicarbazide by contacting a recovery solution with the microporous polymeric body. In various embodiments, the recovery solution can flow in the same or opposite direction of the metal-ion containing solution, where contacting the polymeric body involves flow of a feed past or through the polymeric body. The recovery solution facilitates reuse of the microporous polymeric body to absorb more metal ions. In further embodiments, the metal ion-containing solution can be recycled through the membrane to recover residual metal ions not absorbed in a previous cycle.

The described membranes are sufficiently stable in a variety of solutions. In addition to the metal ions, the metal ion-containing solution can comprise hydrochloric acid, nitric acid, and/or sulfuric acid. The described membrane is stable at low pHs. For example, the described membrane is stable in a solution of 5-30% HCl, e.g., about 10% HCl. In addition, the described membrane is stable in a variety of solvents. Generally, the membrane is stable in any non-solvent indicated herein. Other solvents that do not degrade the polysemicarbazide membrane include aliphatic and aromatic hydrocarbons like hexane, cyclohexane, benzene, and xylene, and chlorinated hydrocarbons like chloroform, ketones like acetone methylisobutylketone.

In various embodiments, the recovery solution comprises an aqueous solution of thiourea and sulfuric acid. The concentration of the solution can range from about 0.1M to 5M of thiourea, preferably about 0.5M, and about 0M to 2M of sulfuric acid, preferably about 0.5M.

Membranes made in accordance with the present disclosure exhibit a high flux. The flux of a microporous polymeric body can be at least 1, 100, 300, 500, 800, 1000, 1100, 1200, 1300, 1400, 1500, 1600, 1700, 1750, 1800, 1900, 2000, 2100, 2200, 2300, 2400, or 2500 L/hm². Even at high fluxes, the desired metal ion can be effectively recovered from the metal ion-containing solution. Loadings of the selectively absorbed metal ion, such as gold, can be at least 0.1, 1, 1.5, 2, 2.5, 3, 3.5, 4, 5, or 6 mmol/g.

In various embodiments, the described membranes are stored in a manner that prevents or mitigates damage. For example, the membranes can be stored in a manner to maintain sufficient wetness with a non-solvent, such as water, until use.

Metals absorbed by the described membrane can be extracted from a variety of sources. For example, sources of gold and/or other precious metals can include electronics, ores, catalysts, and/or jewelry. In addition, the membranes can be used to extract said metals from contaminate water.

D. Examples

Embodiments of the present disclosure will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Polythiosemicarbazide (PTSC) Synthesis

Instructions for synthesizing the PTSC shown in Formula III can be found in Campbell and Tomic, "*Polythiosemicarbazides* 1. *Preparation and Properties of Polymers and Some Simple Metallic Chelates*," J. Polymer Science, 62(174): 379-386 (1962), which is hereby incorporated by reference in its entirety.

For example, the PTSC shown in Formula III was made by stirring a solution containing 3.1 wt % 1,4-diaminopiperazine, 7.6 wt % of 4,4-methylenebis (phenyl isothiocyanate) and 89.2 wt % of DMSO at 50° C. for 24 hours. The resulting polymer was precipitated in water, chopped into small pieces, washed again with water and dried Example 2

Microporous PTSC Film

Figure 3:
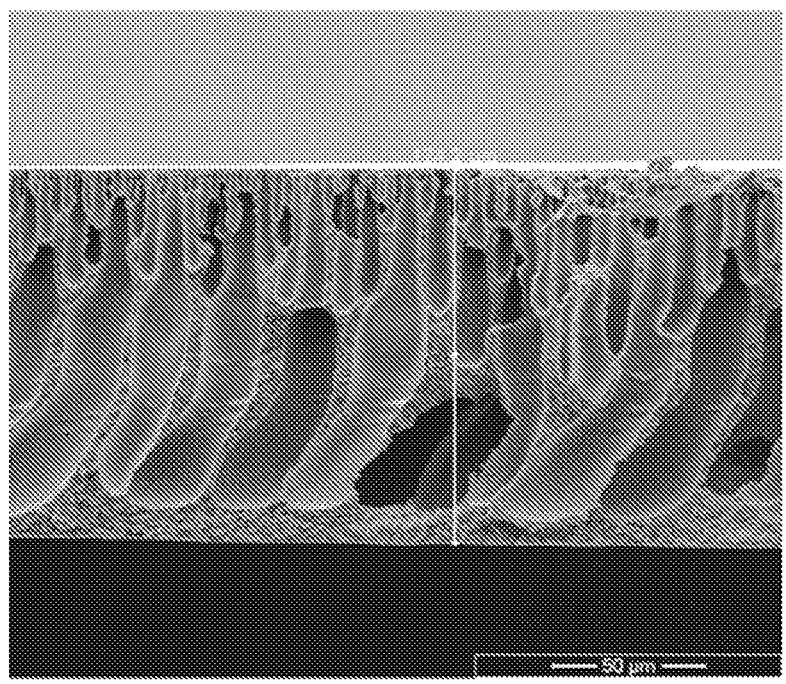
FIG. 3 is an SEM micrograph of a cross-section of the membrane made in accordance with Example 2.

A PTSC polymer was prepared in accordance with Example 1. A polymer solution was prepared comprising 15 wt % PTSC, 75 wt % DMSO, and 10 wt % 1,4-dioxane by mixing the 3 components and stirring for approximately 5 hours at room temperature. The resulting viscous liquid rested for 5 hours to permit the escape of any air bubbles. The polymer solution was casted onto a glass plate into a 250 µm thick film with the use of a doctor knife. The glass plate was then immersed into a non-solvent bath (tap water) at room temperature for at least 12 hours. The membrane was stored in a water bath until use. FIG. 3 depicts a cross-section of the resulting asymmetric membrane.

Example 3

Gold Recovery with Microporous PTSC Membrane at Flux=101 L/M²H

A microporous membrane prepared in accordance with Example 2 was tested with the method(s) described below to assess gold loading of the membrane. The membrane was cut into a four circles, each with an approximate diameter of 2.5 cm and an average dry weight of 14.3 mg. Each membrane was placed on a non-woven polyester circular support of approximately the same size.

Figures 4A, 4B, 5:
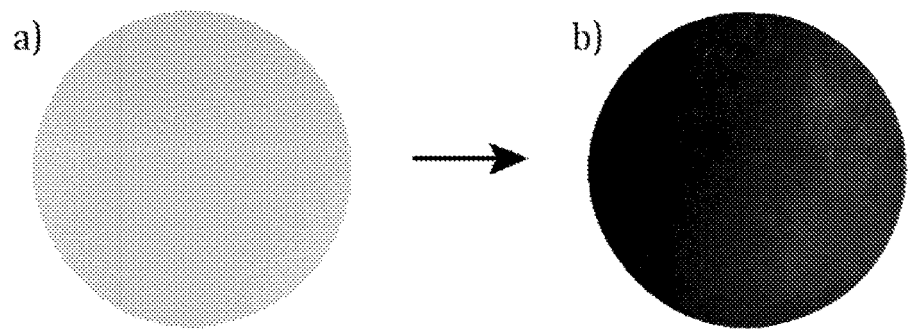
FIGS. 4A-4B are photographs of a membrane made in accordance with Example 2 before gold absorption (A) and after gold absorption (B).
FIG. 5 is a table of the data obtained in Example 5.

Four aqueous solutions containing gold in 10% HCl were prepared at 100 ppm, 200 ppm, 500 ppm, and 1000 ppm. 10 mL of each solution permeated through a membrane with the use of pressurized air. A difference in pressure of 0.5 bar was sufficient to permeate the solutions through the respective membrane with a flux of 101 L/m²h. FIGS. 4A and 4B depict the membranes before gold absorption (4A) and after gold absorption (4B). Prior to gold absorption, the membrane is an off-white color, and afterward, the membrane is a brownish color. The amount of gold absorbed from each solution is provided in Table 1 below.

TABLE 1

| Solution No. | Au Conc. (ppm) | % Absorbed |
| --- | --- | --- |
| 1 | 100 | 98% |
| 2 | 200 | 98% |
| 3 | 500 | 90% |
| 4 | 1000 | 76% |

Example 4

Gold Recovery with Microporous PTSC Membrane at Flux=1800 L/M²H

Three PTSC membranes were prepared and set up in accordance with Example 3, each with an approximate diameter of 2.5 cm and an average dry weight of 14.3 mg.

Three gold solutions were prepared in accordance with Example 3 at 100 ppm, 200 ppm, and 500 ppm. 10 mL of each solution permeated through a membrane with the use of pressurized air. A difference in pressure of 4 bar was sufficient to permeate the solutions through the respective membrane with a flux of 1800 L/m²h. The amount of gold absorbed from each solution is provided in Table 2 below.

TABLE 2

| Solution No. | Au Conc. (ppm) | % Absorbed |
| --- | --- | --- |
| 4 | 100 | 93% |
| 5 | 200 | 78% |
| 6 | 500 | 44% |

Example 5

Gold Recovery from a Copper and Gold Solution with Microporous PTSC Membrane at Flux=1800 L/M²H Three PTSC membranes were prepared and set up in accordance with Example 3, each with an approximate diameter of 2.5 cm and an average dry weight of 14.3 mg.

Three gold-copper solutions were prepared in accordance with Example 3 at concentrations shown in Table 3. 10 mL of each solution permeated through a membrane with the use of pressurized air. A difference in pressure of 4 bar was sufficient to permeate the solutions through the respective membrane with a flux of 1800 L/m²h. The amount of gold and copper absorbed from each solution is provided in Table 3 below. The data of which is provided in FIG. 5.

TABLE 3

| Solution No. | Au Conc. (ppm) | Cu Conc. (ppm) | % Au Absorbed | % Cu Absorbed |
|---|---|---|---|---|
| 7 | 100 | 100 | 99% | 15% |
| 8 | 100 | 500 | 91% | 11% |
| 9 | 500 | 500 | 46% | 3% |
| 10 | 100 | 900 | 97% | 16% |

In actual electronic scrap processing, copper is usually present in much higher concentrations than gold. These experiments show that the gold recovery capacity of the membrane is not affected by higher concentrations of copper. The experiments made with 100 ppm of gold and 100 ppm of copper show that 99% of the gold was absorbed, and increasing the copper to 5 and 9-fold excess show an almost complete absorption of gold at 91% and 97% respectively. Only a small percentage of copper was absorbed for all three. Moreover, these absorption percentages are comparable to the results in Example 4 at the same flux but without copper in the solution.

Example 6

Gold Recovery from the Microporous PTSC Membranes

Gold was successfully recovered from the gold-containing membranes of Example 4 by permeating a solution containing 0.5 M thiourea and 0.5 M sulfuric acid. The process was able to recover at least 98% of the gold.

The above specification and examples provide a complete description of the structure and use of an exemplary embodiment. Although certain embodiments have been described above with a certain degree of particularity, or with reference to one or more individual embodiments, those skilled in the art could make numerous alterations to the disclosed embodiments without departing from the scope of this invention. As such, the illustrative embodiment of the present chelating microporous membrane is not intended to be limited to the particular forms disclosed. Rather, they include all modifications and alternatives falling within the scope of the claims, and embodiments other than the one shown may include some or all of the features of the described embodiments. For example, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A method of isolating metal ions contained in a solution comprising:
    contacting a metal ion-containing solution with a microporous polymeric body wherein the polymer comprises recurring units of the general formula:

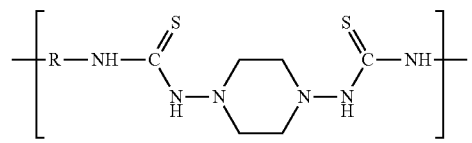

whereby a fraction of metal ions binds to the microporous polymeric body and wherein R is a bivalent hydrocarbon radical;
wherein contacting the metal ion-containing solution with the microporous polymeric body comprises passing the metal ion-containing solution through the microporous polymeric body with pressurized air;
wherein the metal-ion containing solution comprises a first metal ion and a second metal ion; wherein the microporous polymeric body selectively absorbs the first metal ion;
wherein the first metal is gold and the second metal is copper;
wherein the metal ion-containing solution comprises 100 to 500 ppm gold metal ions.

2. The method of claim 1, further comprising contacting a recovery solution with the microporous polymeric body to desorb the metal ions from the microporous polymeric body.

3. The method of claim 2, wherein the recovery solution comprises thiourea and sulfuric acid.

4. The method of claim 2, wherein the microporous polymeric body is contacted with the metal ion-containing solution after contact with the recovery solution.

5. The method of claim 1, wherein the metal ion solution is passed through the microporous polymeric body with a flux of at least 100 L/m²h.

6. The method of claim 5, wherein the metal ion solution is passed through the microporous polymeric body with a flux of at least 1500 L/m2h.

7. The method of claim 1, wherein R comprises an alkanediyl, oxy-alkanediyl, diphenylmethane, or phenylene.

8. The method of claim 1, wherein the polymer comprises the following recurring unit:

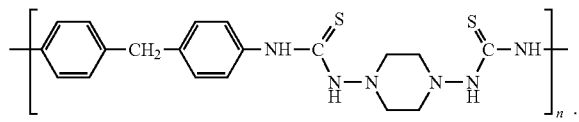

9. The method of claim 1, wherein the microporous polymeric body is formed by a process comprising immersing a solution of the polymer into a vessel comprising a non-solvent or by contacting a polymer solution with a vapor comprising a non-solvent.

10. The method of claim 9, wherein the solution of the polymer comprises 3 wt % to 20 wt % 1,4-dioxane.

11. The method of claim 8, wherein the microporous polymeric body is an asymmetric membrane.

12. The method of claim 11, wherein the asymmetric membrane has a thickness within a range of 20 μm to 250 μm.

13. The method of claim 12, wherein the asymmetric membrane is a flat sheet, and the method further comprises placing the asymmetric membrane on a non-woven polyester support before contacting the metal-ion containing solution.

* * * * *